US007123402B1

(12) United States Patent
Doerr et al.

(10) Patent No.: US 7,123,402 B1
(45) Date of Patent: Oct. 17, 2006

(54) CLONING OPTICAL-FREQUENCY COMB SOURCES

(75) Inventors: Christopher Richard Doerr, Middletown, NJ (US); Peter J. Winzer, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/333,105

(22) Filed: Jan. 17, 2006

(51) Int. Cl.
*G02F 2/02* (2006.01)
*H01S 3/098* (2006.01)

(52) U.S. Cl. ............................ 359/326; 372/9; 372/18

(58) Field of Classification Search ........ 359/326–332; 372/9, 18
See application file for complete search history.

(56) References Cited

U.S. PATENT DOCUMENTS 5,822,476 A * 10/1998 Jopson ........................ 385/27
6,831,935 B1 * 12/2004 Ye et al. ....................... 372/18
2004/0213302 A1 * 10/2004 Fermann et al. ............... 372/6

FOREIGN PATENT DOCUMENTS

JP 2005300905 A * 10/2005

OTHER PUBLICATIONS

U.S. Appl. No. 11/296,996, filed Dec. 8, 2005, Doerr.

"Carrier Envelope Phase Control Of Femtosecond Mode-Locked Lasers and Direct Optical Frequency Synthesis," by D.J. Jones, et al., Science vol. 288, 2000, pp. 635-639.

"Optical Clockworks And The Mesurement Of Laser Frequencies With A Mode-Locked Frequency Comb," by R. Holzwarth, et al. IEEE, Journal of Quantum Electronics, 2001, vol. 37, No. 12, pp. 1493-1501.

* cited by examiner

*Primary Examiner*—John D. Lee

(57) ABSTRACT

Method and apparatus for creating a clone relationship between two or more optical-frequency comb sources (OFCSs). In one embodiment, the invention is an apparatus having (i) first and second OFCSs, each adapted to generate a respective frequency comb, and (ii) means for locking the phases of two comb lines of the first OFCS and the phases of the respective two comb lines of the second OFCS to create a full or partial clone relationship between these two OFCSs. In one system configuration, the locking of the phases of the first and second OFCSs is achieved by locking the phases of two selected comb lines generated by each of these OFCSs to the phases of the respective comb lines generated by the same (third, reference) OFCS. In an alternative system configuration, the locking of the phases of the first and second OFCSs is achieved by locking the phases of two selected comb lines generated by the first OFCS to the phases of the respective comb lines generated by the third OFCS, and locking the phases of two selected comb lines generated by the second OFCS to the phases of the respective comb lines generated by the first OFCS.

20 Claims, 6 Drawing Sheets

CLONING OPTICAL-FREQUENCY COMB SOURCES

CROSS-REFERENCE TO RELATED APPLICATIONS

The subject matter of this application is related to that of U.S. patent application Ser. No. 11/333,106, filed on the same date as the present application, and entitled "Use of Beacons in a WDM Communication System," which is incorporated herein by reference in its entirety.

BACKGROUND OF THE INVENTION

1. Field of the Invention

The present invention relates to optical sources that can, for example, be used in optical wavelength division multiplexing (WDM) communication systems.

2. Description of the Related Art

Light sources are used in many fields, e.g., optical communications, metrology, medicine, and natural sciences. Many applications related to these fields make use of multiple light sources that have correlated properties, e.g., predetermined wavelength and/or phase relationships. However, the systems and methods for creating suitable correlated light sources are not sufficiently developed yet.

For example, in optical communications, a phase-shift keying (PSK)-modulated signal can be decoded at the receiver using homodyne detection, in which a local oscillator (LO) signal having a well-defined phase relationship with the received signal is utilized. However, one problem with the use of homodyne PSK in a WDM communication system is that homodyne detection utilizes a separate phase-locked LO signal for each WDM wavelength. In a typical prior-art WDM system, the task of providing these separate phase-locked LO signals for the WDM wavelengths carries the burden of providing separate light sources and phase-lock loops for different wavelengths, which can add significantly to the complexity, size, and cost of each transceiver. This burden might substantially prohibit the use of homodyne PSK in WDM systems having a relatively large number (e.g., greater than about 20) of WDM channels.

SUMMARY OF THE INVENTION

Problems in the prior art are addressed, in accordance with the principles of the present invention, by creating a clone relationship between two or more optical-frequency comb sources (OFCSs). An OFCS is an optical source adapted to generate a plurality of frequency components (also referred to as comb lines) having a well-defined phase relationship with one another. One example of an OFCS is a pulsed mode-locked laser. Two OFCSs have a clone relationship when these two OFCSs are configured to generate their respective frequency combs such that these frequency combs have at least two common frequencies, with the phases of the comb lines having the same common frequency locked to one another. These two OFCSs are referred to as partial clones if their frequency combs have one or more frequencies that appear in one of the frequency combs, but not in the other. On the other hand, if the frequency combs have substantially identical frequencies and the phase of each comb line of one frequency comb is locked to the phase of the respective comb line of the other frequency comb, then these two OFCSs are referred to as full clones.

Advantageously, OFCS clones can be used as correlated light sources suitable for various applications in optical communications, metrology, medicine, natural sciences, etc. For example, having OFCS clones at various nodes of a WDM communication system enables the system to use PSK modulation and homodyne detection, while employing a single phase-lock loop. Since OFCS clones are substantially phase-locked to one another, one of these OFCS clones is used at a transmitter to produce a WDM communication signal and another OFCS clone is used at a receiver to produce multiple local-oscillator signals suitable for homodyne detection of the WDM communication signal received from the transmitter.

In one embodiment, the invention is implemented by an apparatus having (i) first and second OFCSs, each adapted to generate a respective frequency comb, and (ii) means for locking the phases of two comb lines of the first OFCS and the phases of the respective two comb lines of the second OFCS to create a full or partial clone relationship between these two OFCSs. In one system configuration, the locking of the phases of the first and second OFCSs is achieved by locking the phases of two selected comb lines generated by each of these OFCSs to the phases of the respective comb lines generated by a same third, reference OFCS. This third OFCS can, for example, be either a master OFCS that is independently referenced to a frequency standard (e.g., an atomic clock) or a slave OFCS that is locked to a master OFCS. In an alternative system configuration, the locking of the phases of the first and second OFCSs is achieved by locking the phases of two selected comb lines generated by the first OFCS to the phases of the respective comb lines generated by the third OFCS, and locking the phases of two selected comb lines generated by the second OFCS to the phases of the respective comb lines generated by the first OFCS.

DETAILED DESCRIPTION

Although, the description of systems and methods representing various embodiments of the invention are primarily given in reference to optical communication systems, one skilled in the art will appreciate that the invention is not limited solely to communication systems. For example, systems and methods of the invention can similarly be used in the fields of metrology, medicine, and scientific research. In general, various embodiments of the invention can be utilized wherever two or more correlated light sources need to be provided.

Figure 1:
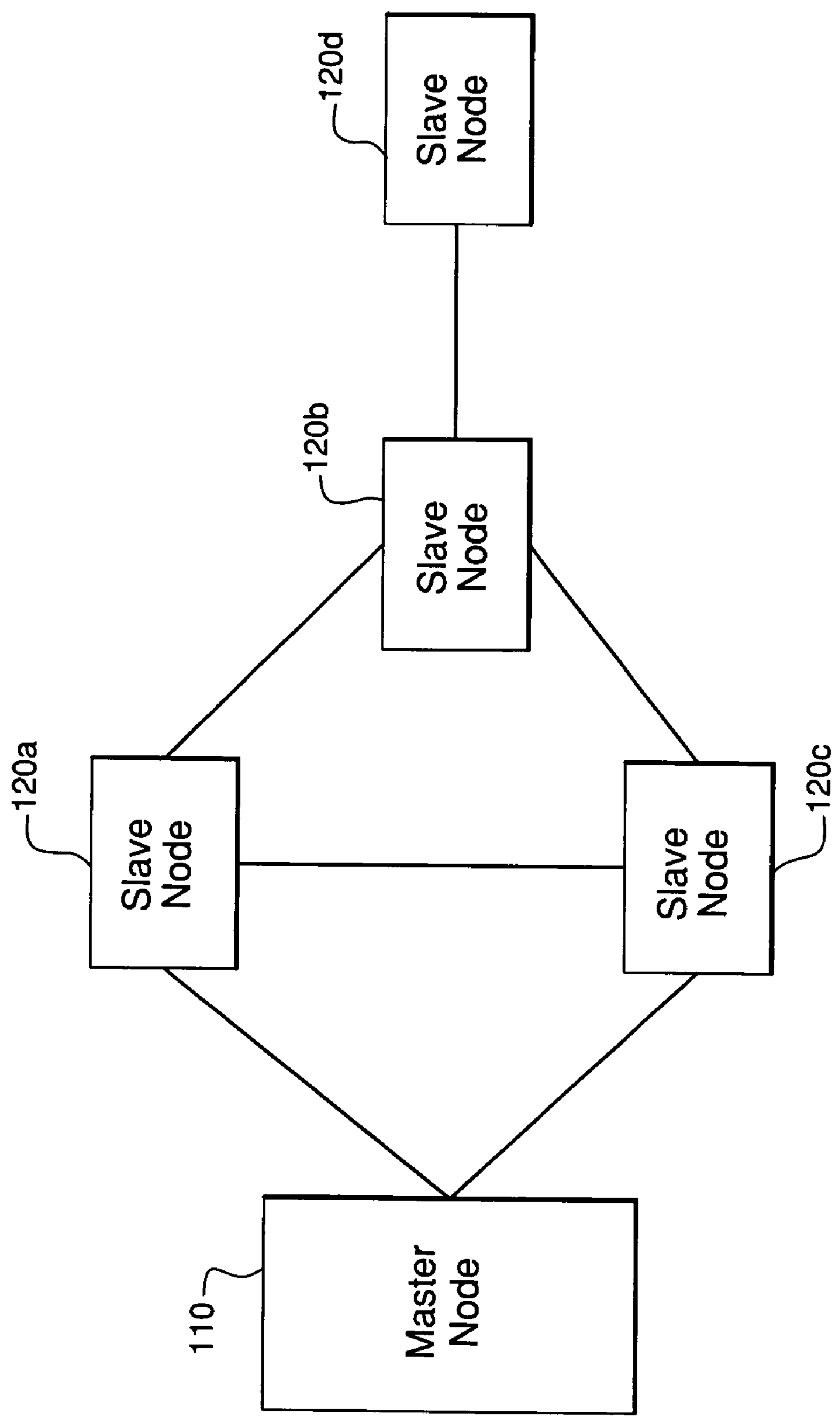
FIG. 1 shows a block-diagram of a WDM communication system according to one embodiment of the invention.

FIG. 1 shows a block-diagram of a WDM communication system 100 according to one embodiment of the invention. System 100 is illustratively shown as having five communication nodes, i.e., a master node 110 and four slave nodes 120*a–d*. In the configuration of FIG. 1, only slave nodes 120*a* and 120*c* have direct communication links with master node 110. Each of slave nodes 120*b* and 120*d* does not have a direct communication link with master node 110 and is connected to the master node only indirectly, i.e., via one or more other slave nodes 120. Only slave node 120*b* has a direct communication link with each of the other slave nodes 120, while each of slave nodes 120*a,c,d* has direct communication links with fewer than all other slave nodes 120. Other configurations of system 100, in which each of the nodes is linked directly or indirectly to each of the other nodes, are also possible. In alternative embodiments, system 100 can have two or more master nodes 110 variously connected to each other and the slave nodes.

Each of the nodes in system 100 has one or more optical-frequency comb sources (OFCSs, not shown in FIG. 1). Each OFCS is adapted to generate a plurality of frequency (wavelength) components, termed a "frequency comb." In one configuration, the frequency components (comb lines) of a frequency comb can be substantially uniformly spaced. In another configuration, some of the comb lines can be suppressed or filtered out to create a frequency comb having non-uniformly spaced comb lines.

If two OFCSs are configured to generate their respective frequency combs such that the frequency combs have substantially identical frequency components (comb lines), with each frequency component of one frequency comb phase-locked to the corresponding frequency component of the other frequency comb, then it is said that these two OFCSs are full clones of each other. Alternatively, if two OFCSs are configured to generate their respective frequency combs such that these frequency combs have (i) at least two common frequencies, with the corresponding frequency components phase-locked to one another, and (ii) one or more frequencies that appear in one of the frequency combs, but not in the other, then it is said that these two OFCSs are partial clones of each other.

WDM PSK with homodyne detection in system 100 can, for example, be enabled by providing full and/or partial OFCS clones to different nodes of the system. For example, in one configuration, two OFCSs located at slave nodes 120*a* and 120*c*, respectively, are each other's full clones. When data are transmitted from node 120*a* to node 120*c*, one or more of the comb lines generated by the OFCS of node 120*a* are modulated with data using PSK modulation, multiplexed to form a WDM signal, and applied to the corresponding communication link for transmission to node 120*c*. At node 120*c*, the received WDM signal is de-multiplexed and each modulated comb line is processed using homodyne detection. Because the OFCS of node 120*c* is a full clone of the OFCS of node 120*a*, the former has appropriate characteristics to provide a respective local oscillator (LO) signal for each modulated frequency component received from node 120*a*.

Similarly, when data are transmitted from node 120*c* to node 120*a*, one or more of the comb lines generated by the OFCS of node 120*c* are modulated with data using PSK modulation, multiplexed to form a WDM signal, and applied to the communication link for transmission to node 120*a*. At node 120*a*, the received WDM signal is de-multiplexed and each modulated frequency component is processed using homodyne detection, for which the OFCS of node 120*a* provides appropriate LO signals.

Master node 110 is different from any of slave nodes 120 in that the master node has a master OFCS that is referenced to a frequency standard, e.g., a Cs atomic clock. Due to the referencing, the master OFCS is capable of: (i) generating optical frequencies with relatively high accuracy, (ii) maintaining stability of its frequency comb over time, and (iii) providing a reference signal to other OFCSs in system 100. Each of slave nodes 120 has a slave OFCS that might not be referenced to a local frequency standard. A slave OFCS is able to maintain the accuracy and stability of its frequency comb by phase- and frequency-locking one or more of its frequency components to the corresponding components of a master OFCS. If each of two slave OFCSs is directly referenced to a master OFCS using substantially identical referencing procedures, then those two slave OFCSs can become each other's full or partial clones. Then, a group of clones can be produced by appropriately referencing each OFCS in the group to a master OFCS.

When system 100 has at least one slave OFCS referenced directly to a master OFCS, full and/or partial clones of that slave OFCS can also be produced by locking additional slave OFCSs to the referenced slave OFCS. In addition, a serial cloning approach, in which a clone of a clone is produced, can be employed to produce more clones. One skilled in the art will appreciate that, for as long as each OFCS clone in a group of clones has direct or indirect (i.e., via other clones) referencing to a master OFCS, sufficient accuracy and stability of the corresponding frequency combs can be maintained in system 100 to provide appropriate carrier and LO signals for inter-node communications.

Figure 2A:
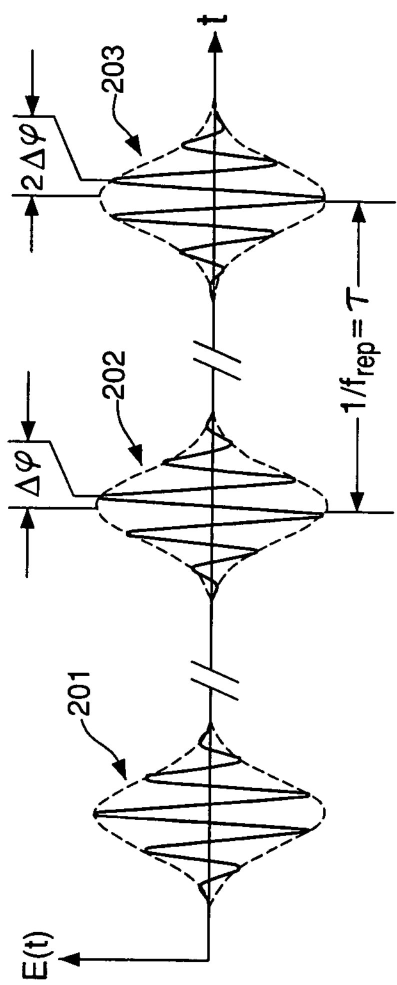
FIGS. 2A–B graphically illustrate representative characteristics of an optical-frequency comb source (OFCS) that can be used in the system of FIG. 1 as a master or slave OFCS according to one embodiment of the invention.
Figure 2B:
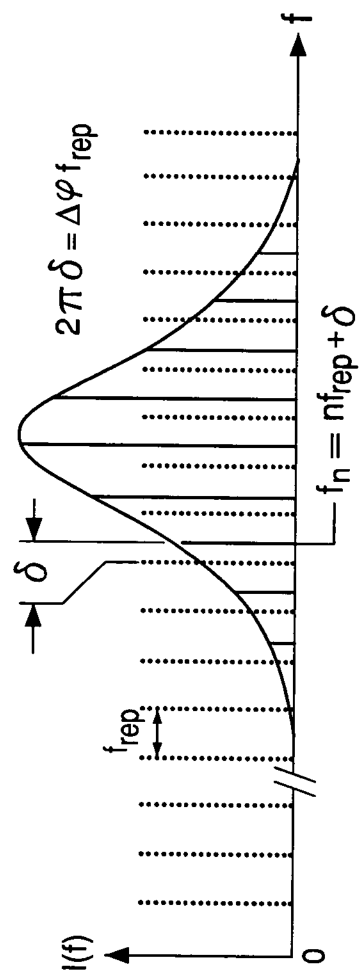

FIGS. 2A–B graphically illustrate representative characteristics of an OFCS that can be used in system 100 as a master or slave OFCS according to one embodiment of the invention. More specifically, the OFCS corresponding to FIG. 2 is based on a mode-locked laser with a controlled carrier-envelope offset (CEO) phase. In one embodiment, the OFCS of FIG. 2 has an octave-spanning spectrum.

FIG. 2A shows a pulse train generated by a representative mode-locked laser with CEO phase control. More specifically, three consecutive pulses in the train are shown, with the solid lines representing the electric-field carrier wave and the dashed lines representing the corresponding pulse envelopes. The envelope peak-to-peak separation between consecutive pulses ($\tau$) is $1/f_{rep}$, where $f_{rep}$ is the pulse repetition rate. As can be seen in FIG. 2A, the relative phase between the peak of the pulse envelope and the underlying electric-field carrier wave is not constant and varies from pulse to pulse. For example, for pulse 201, the peak of the pulse envelope is aligned with a peak of the electric-field carrier, i.e., the relative phase is zero. However, for pulse 202, the relative phase between the peak of the pulse envelope and the nearest peak of the electric-field carrier has changed to become $\Delta\phi$; and, for pulse 203, this relative phase has further incremented by $\Delta\phi$ to become $2\Delta\phi$. This pulse-to-pulse phase evolution is primarily due to the fact that the group and phase velocities differ inside the mode-locked laser cavity. However, advantageously, modern laser techniques enable effective control and stabilization of the CEO-phase increment ($\Delta\phi$) to produce predictable and reproducible phase evolution.

FIG. 2B shows a frequency spectrum corresponding to the pulse train of FIG. 2A. More specifically, the vertical solid lines represent modes of the frequency comb corresponding to the pulse train of FIG. 2A, with the bell-shaped curve indicating the frequency-comb envelope. Note that, in the frequency domain, the output of a CEO-phase-controlled mode-locked laser is substantially equivalent to the combined output of a collection of correlated continuous-wave (CW) lasers, each producing a corresponding frequency mode of the frequency comb. The vertical dotted lines in FIG. 2B show a frequency grid, $nf_{rep}$, where n is a positive integer. As seen in FIG. 2B, the frequency comb generated by the CEO-phase-controlled mode-locked laser is not necessarily aligned with this frequency grid, but, in general, is shifted with respect to the grid by an offset frequency, $\delta=\Delta\phi f_{rep}/2\pi$, with the individual frequencies ($f_n$) in the frequency comb described by Eq. (1) as follows:

$$f_n=nf_{rep}+\delta \quad (1)$$

One consequence of the relationship given by Eq. (1) is that control of the phase increment ($\Delta\phi$) provides effective means for controlling the absolute values of the optical frequencies in the frequency comb. Additional details on the characteristics of CEO-phase-controlled mode-locked lasers can be found, e.g., in D. J. Jones, et al., Science, vol. 288, p. 635 (2000), the teachings of which are incorporated herein by reference.

Figure 3:
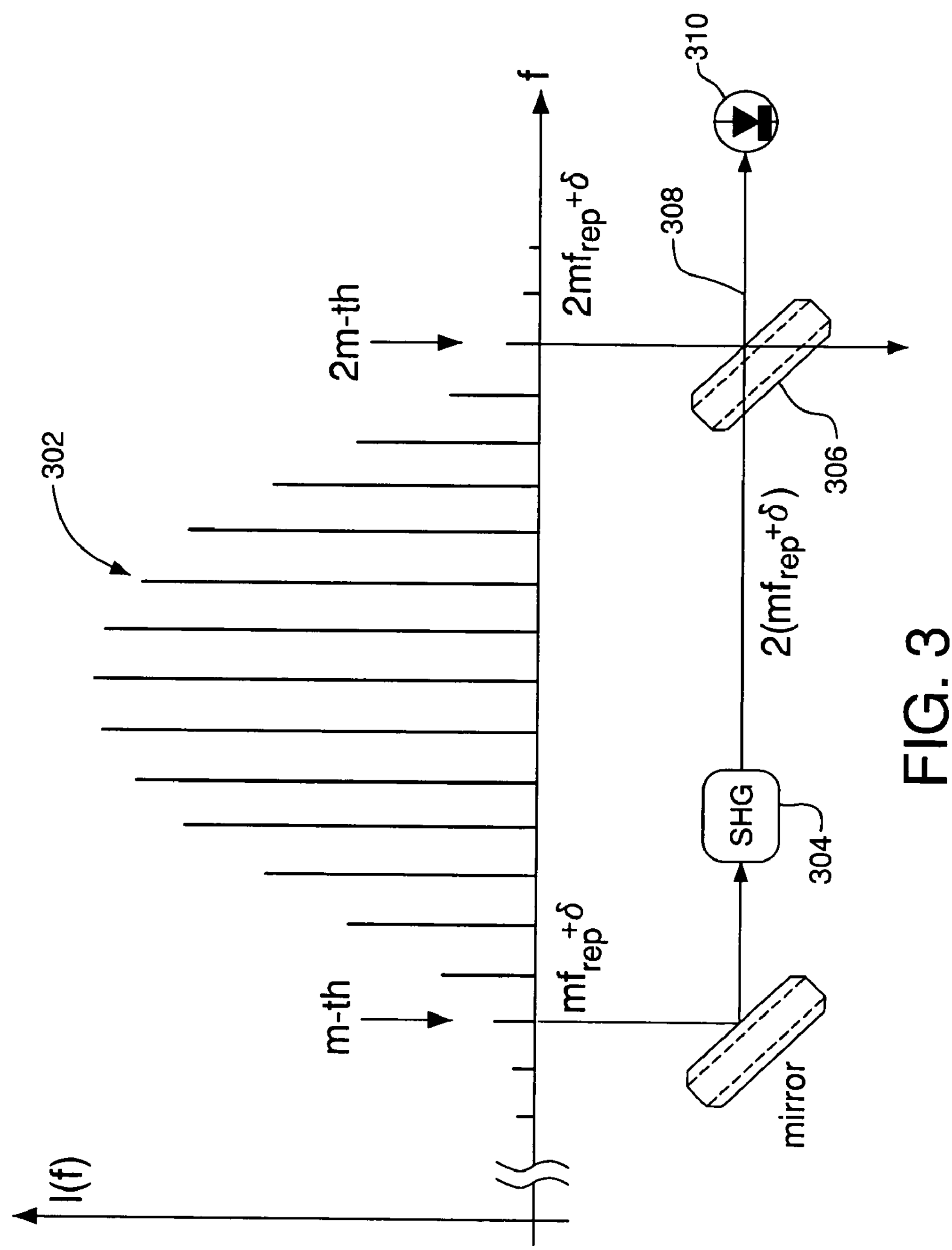
FIG. 3 illustrates a method of measuring an offset frequency for the OFCS illustrated in FIG. 2 according to one embodiment of the invention.

FIG. 3 illustrates a method of measuring the offset frequency $\delta$ of FIG. 2 according to one embodiment of the invention. The method of FIG. 3 is generally applicable to an octave-spanning frequency comb and can be used to accurately reference and control the output of a corresponding CEO-phase-controlled mode-locked laser, e.g., when that laser is configured to serve as a master OFCS. More specifically, according to the method of FIG. 3, light corresponding to an m-th mode (where m is a positive integer) from the low-frequency side of an octave-spanning frequency comb 302 is frequency doubled using a second-harmonic-generating (SHG) element 304. The resulting second harmonic has a frequency of $f_{SH}=2f_m=2mf_{rep}+2\delta$. The second harmonic is then combined, using a semitransparent mirror 306, with the (2m)-th mode from the high-frequency side of frequency comb 302, which mode has a frequency of $f_{2m}=2mf_{rep}+\delta$. A combined signal 308 has a difference frequency (beat note) $f_{SH}-f_{2m}=\delta$. Thus, the offset frequency for the CEO-phase-controlled mode-locked laser can be monitored by measuring the frequency of the beat note with a suitable photodetector 310. The value of $\delta$ can be adjusted by configuring the laser to set the group and phase velocities in the laser cavity such that the frequency comb is appropriately positioned with respect to the frequency grid. In one embodiment, the method of FIG. 3 can be used to reference frequency comb 302 to an atomic clock to establish, e.g., a frequency-alignment accuracy of about 100 Hz or better. More details, on atomic-clock referencing of CEO-phase-controlled mode-locked lasers can be found, e.g., in R. Holzwarth, et al., IEEE J. Quant. Electron., vol. 37, p. 1493 (2001), the teachings of which are incorporated herein by reference.

Figure 4:
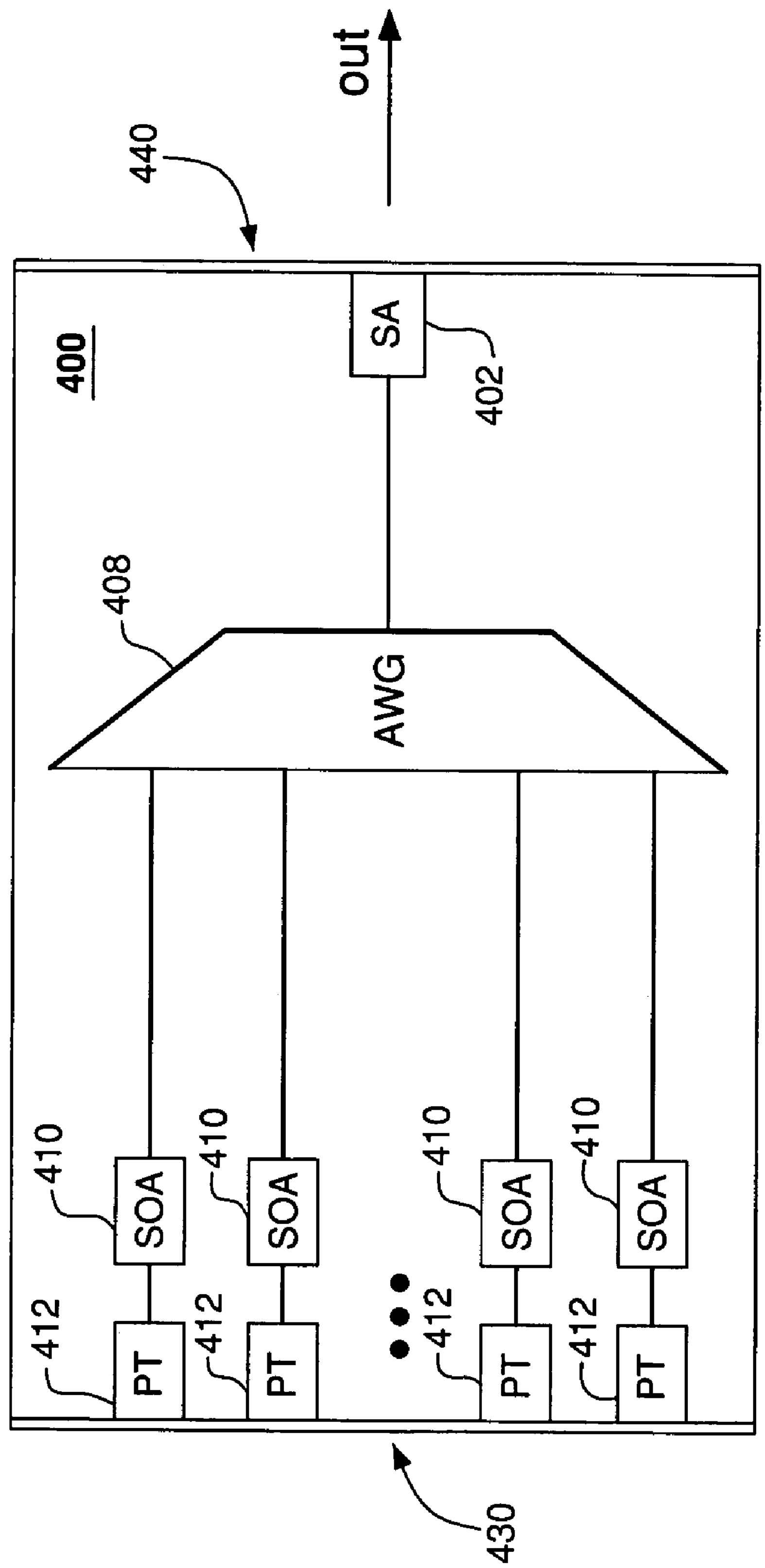
FIG. 4 shows a circuit diagram of a mode-locked laser that has the OFCS characteristics illustrated by FIG. 2 according to one embodiment of the invention.

FIG. 4 shows a circuit diagram of a mode-locked laser 400 that has the OFCS characteristics illustrated in FIG. 2 according to one embodiment of the invention. In one implementation, laser 400 is adapted to generate an octave-spanning frequency comb. The method of FIG. 3 is then applied to obtain atomic-clock referencing and configure the laser to function as a master OFCS in system 100. Alternatively, laser 400 having an octave-spanning frequency comb can be configured to function without atomic-clock referencing as a slave OFCS. In another implementation, laser 400 is adapted to generate a frequency comb that is not octave spanning. The laser can then be configured as a slave OFCS in system 100.

Laser 400 has an optical cavity defined by a highly reflective mirror 430 and a partially transparent mirror 440. The optical cavity has an arrayed waveguide grating (AWG) 408 having a plurality of overlapping optical passbands. For each passband, the optical cavity has a dedicated semiconductor optical amplifier (SOA) 410 serially connected with a dedicated phase tuner (PT) 412. Each SOA 410 is adapted to provide optical gain for the respective optical passband, and the respective phase tuner 412 is adapted to substantially provide dispersion compensation within that optical passband. The optical cavity also has a saturable absorber (SA) 402 adapted to modulate optical losses in the cavity such that the optical gains provided by SOAs 410 and the loss modulation provided by SA 402 create conditions for an optical pulse train to be emitted from the cavity through partially transparent mirror 440. Spectral characteristics of the frequency comb corresponding to the pulse train can be controlled, e.g., by appropriately configuring phase tuners 412. A more detailed description of laser 400 can be found in commonly owned U.S. patent application Ser. No. 11/296,996, filed on Dec. 8, 2005, and entitled "Wide-Bandwidth Mode-Locked Laser," the teachings of which are incorporated herein by reference.

Figure 5:
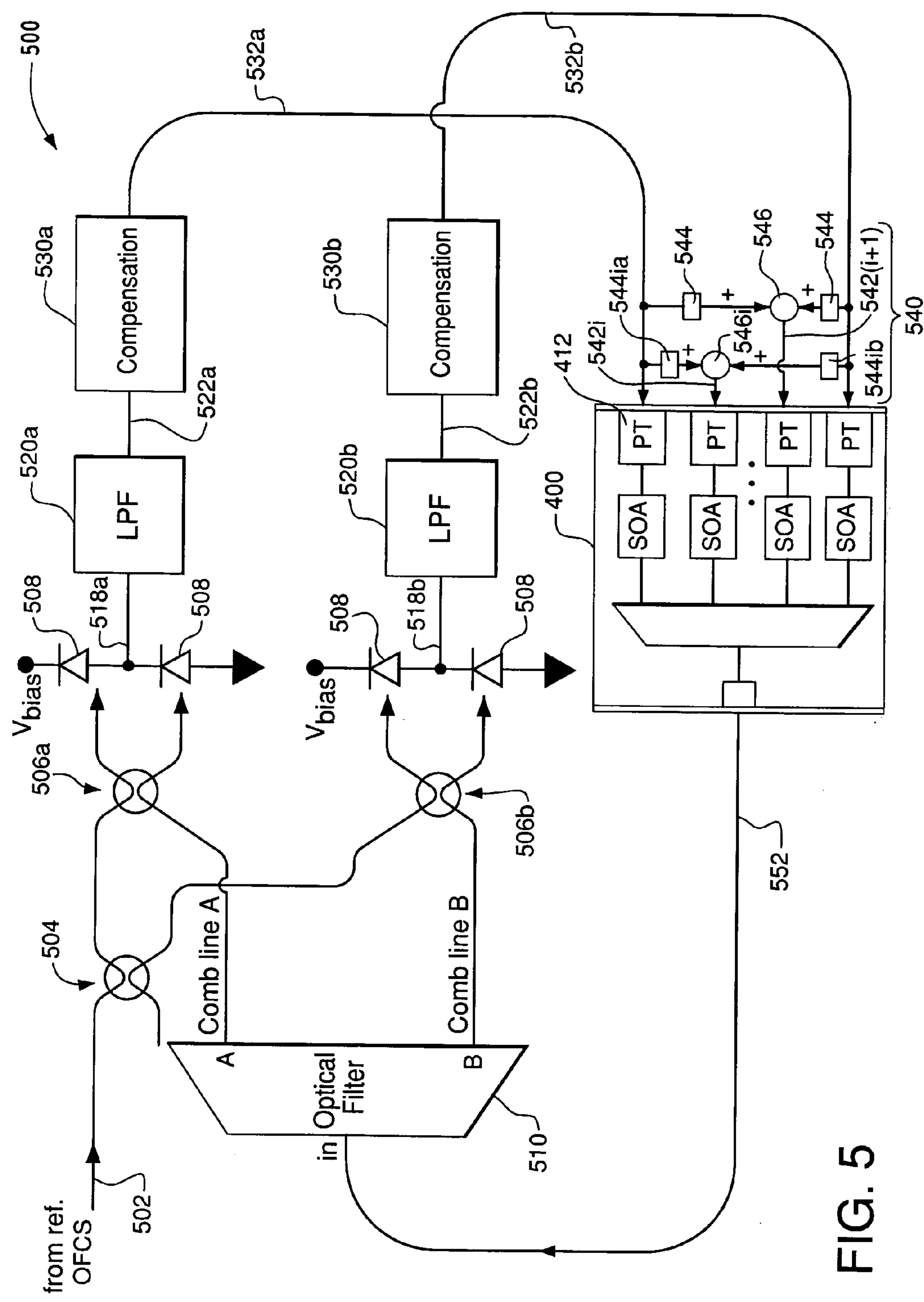
FIG. 5 shows a feedback circuit that can be used to lock the laser of FIG. 4 to a reference OFCS according to one embodiment of the invention.

FIG. 5 shows a feedback circuit 500 that can be used to lock laser 400 to a reference OFCS according to one embodiment of the invention. In the embodiment of FIG. 5, laser 400 is configured to function as a slave OFCS. The reference OFCS (not shown) could be either a master OFCS or a different slave OFCS that is referenced directly or indirectly to the master OFCS. The reference OFCS could be located at the same node as laser 400 or at a different node. As a result of phase locking using circuit 500, laser 400 and the reference OFCS can establish a full or partial clone relationship.

An optical output signal 552 of laser 400 is applied to an optical filter 510 that blocks all comb lines of signal 552, except for the two comb lines designated in FIG. 5 as comb lines A and B, respectively. After passing through optical filter 510, comb lines A and B appear at ports A and B, respectively, of the filter. An optical signal 502 received from the reference OFCS is split into two attenuated copies using an optical coupler 504. The first attenuated copy of signal 502 and comb line A from port A of optical filter 510 are applied to an optical coupler 506*a*. Similarly, the second attenuated copy of signal 502 and comb line B from port B of optical filter 510 are applied to an optical coupler 506*b*.

Each of optical couplers 506*a–b* is designed to produce two interference signals from the respective attenuated copy of signal 502 and the respective one of comb lines A and B. Each interference signal is then directed to a respective one of photodetectors 508, where that signal is converted into a corresponding electrical signal. Photodetectors 508 in circuit 500 are arranged in two pairs, with the two photodetectors of each pair serially connected to one another as indicated in FIG. 5. A signal 518 generated by each photodetector pair is essentially a difference signal between the electrical signals produced by the respective photodetectors. Each signal 518 is applied to a respective low-pass filter (LPF) 520 to produce a respective filtered signal 522. Each filtered signal 522 is then fed into a respective compensation circuit 530, which, based on that signal, produces a respective control signal 532 applied to laser 400.

In case of a frequency mismatch between comb line A and a corresponding comb line of signal 502, signal 518*a* has a beat frequency corresponding to the frequency difference between the comb lines. Since LPF 520*a* is adapted to block this beat frequency, signal 522*a* is substantially zero. On the other hand, if the frequency of comb line A substantially matches the frequency of the corresponding comb line of signal 502, then signal 518*a* has a DC component proportional to sin $\phi$, where $\phi$ is a phase shift between the comb lines. LPF 520*a* passes this DC component to produce filtered signal 522*a*. Compensation circuit 530*a* is designed to produce control signal 532*a* such as to substantially drive signal 522*a* to zero. Since the zero of signal 522*a* corresponds to $\phi=0$, laser 400 is driven by circuit 530*a* to have its comb line A phase- and frequency-locked to the corresponding comb line of signal 502.

Similarly, in case of a frequency mismatch between comb line B and a corresponding comb line of signal 502, signal 518*b* has a beat frequency corresponding to the frequency difference between the comb lines that is blocked by LPF 520*b*. On the other hand, if the frequency of comb line B substantially matches the frequency of the corresponding comb line of signal 502, then signal 518*b* has a DC component that passes through LPF 520*b* to form signal 522*b*. Compensation circuit 530*b* then produces control signal 532*b* such as to substantially drive signal 522*b* to zero, thereby driving laser 400 to have its comb line B phase- and frequency-locked to the corresponding comb line of signal 502.

Note that, in laser 400, signal 532*a* is applied to the phase tuner 412 corresponding to the spectral passband having comb line A. Similarly, signal 532*b* is applied to the phase tuner 412 corresponding to the spectral passband having comb line B. Controls signals 542 (only two of which are illustratively shown in FIG. 5) that are applied to other phase tuners 412 of laser 400 are generated by a control circuit 540 based on control signals 532*a–b*. More specifically, each control signal 542 is a combination of signals 532*a–b* taken with appropriate weights. For example, control signal 542-*i* applied to an i-th phase tuner 412 is produced using Eqs. (2A–C) as follows:

$$S_{542i}=w_{ai}S_{532a}+w_{bi}S_{532b} \tag{2A}$$

$$w_{ai}=\frac{F_i-F_B}{F_A-F_B} \tag{2B}$$

$$w_{bi}=\frac{F_A-F_i}{F_A-F_B} \tag{2C}$$

where $S_{542i}$, $S_{532a}$, and $S_{532b}$ are the magnitudes of signals 542-*i*, 532*a*, and 532*b*, respectively; $w_{ai}$ and $w_{bi}$ are the weighting coefficients; $F_A$, $F_B$, and $F_i$ are the center frequencies of the spectral passbands corresponding to the phase tuner 412 receiving signal 532*a*, the phase tuner 412 receiving signal 532*b*, and the i-th phase tuner 412, respectively.

Control circuit 540 includes a plurality of weighting blocks 544 and a plurality of summation nodes 546 that implement Eqs. (2A–C). For example, weighting block 544*ai* multiplies signal 532*a* by a factor of $w_{ai}$. Similarly, weighting block 544*bi* multiplies signal 532*b* by a factor of $w_{bi}$. The resulting weighted signals are then summed in summation node 546*i* to produce signal 542-*i*.

Although, in FIG. 5, comb lines A and B are shown to correspond to two peripheral (outermost) phase tuners 412, feedback circuit 500 can similarly be configured to operate when at least one of comb lines A and B corresponds to an inner phase tuner 412. Equations analogous to Eqs. (2A–C) and providing interpolations/extrapolations of the magnitudes of signals 532*a* and 532*b* for the generation of signals 542-*i* can similarly be used.

Figure 6:
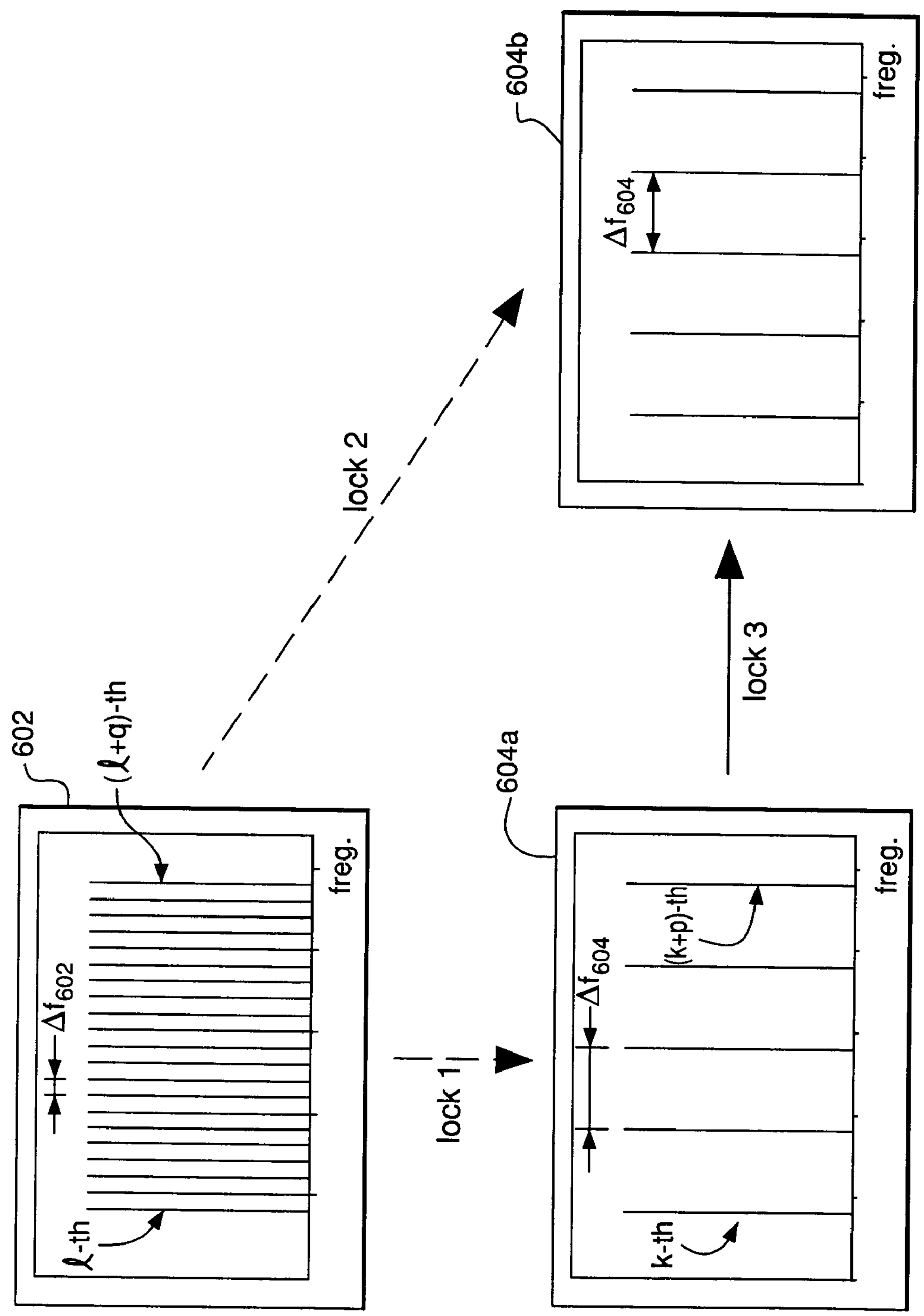
FIG. 6 illustrates a method of producing OFCS clones according to one embodiment of the invention.

FIG. 6 illustrates a method of producing OFCS clones according to one embodiment of the invention. More specifically, FIG. 6 shows three OFCSs 602, 604*a*, and 604*b* with graphs representing their respective frequency combs. OFCS 602 is a master OFCS referenced to a frequency standard, e.g., as described above in the context of FIG. 3, or an octave-spanning CEO-phase-controlled mode-locked laser. OFCSs 604*a–b* are slave OFCSs. In one embodiment, OFCSs 602 and 604*a* are located at the same communication node, e.g., master node 110 (FIG. 1), and OFCS 604*b* is located at a different communication node, e.g., slave node 120*a* (FIG. 1). In another embodiment, each of OFCSs 602, 604*a*, and 604*b* is located at a different communication node.

Due to the octave-spanning feature, OFCS 602 typically has a relatively large size and operates at a relatively low repetition rate, e.g., about 100 MHz. As a result, the spectral separation ($\Delta f_{602}$) between the comb lines of OFCS 602 is also relatively small. This relatively small spectral separation might be insufficient to support a relatively high bit rate, e.g., about 10 Gbit/s, because the modulation broadening would cause crosstalk between different WDM signal components.

OFCS 604*a* can include a mode-locked laser similar to laser 400 that is designed to have a relatively short cavity and a relatively high repetition rate. As a result, the spectral separation ($\Delta f_{604}$) between the comb lines of OFCS 604*a* is relatively large, and these lines can be used to produce components of a WDM signal having a correspondingly high bit rate. The accuracy and stability of the frequency comb of OFCS 604*a* is achieved by phase- and frequency-locking two of its comb lines to the corresponding lines of master OFCS 602. For example, the k-th and (k+p)-th comb lines of OFCS 604*a* are locked to the l-th and (l+q)-th comb lines, respectively, of OFCS 602 using, e.g., circuit 500 of FIG. 5. The process of locking OFCS 604*a* to master OFCS 602 is indicated in FIG. 6 by the dashed arrow labeled "lock 1." If q>p, then spectral separation $\Delta f_{604}$ is greater than spectral separation $\Delta f_{602}$ by a factor of q/p. In one embodiment, the value of q/p is an integer, e.g., 10.

In one system configuration, OFCS 604*b*, which is substantially similar to OFCS 604*a*, can similarly be locked to OFCS 602 as indicated by the dashed arrow labeled "lock 2." In an alternative system configuration, OFCS 604*b* can be locked to OFCS 604*a*, e.g., by locking the k-th and (k+p)-th comb lines of OFCS 604*b* to the k-th and (k+p)-th comb lines, respectively, of OFCS 604*a* using a second instance of circuit 500. In yet another configuration, a pair of comb lines different from the {k-th, (k+p)-th} pair of comb lines can be used to lock OFCS 604*b* to OFCS 604*a* without a change of spectral separation. The process of locking OFCS 604*b* to OFCS 604*a* is indicated in FIG. 6 by the solid arrow labeled "lock 3."

When (i) two OFCSs, such as OFCSs 604*a–b*, are configured to produce frequency combs having the same spectral separation between comb lines and (ii) two comb lines of one OFCS are phase-locked to the two respective comb lines of the other OFCS, e.g., as described above in the context of FIG. 5, all other respective comb lines of these two OFCSs similarly become phase-locked to one another.

When a locking procedure having locking steps "lock 1" and "lock 2" is performed, two comb lines of OFCS 604*a* become locked to two comb lines of OFCS 604*b* by virtue of being locked to the same two respective comb lines of master OFCS 602. As a result, all respective comb lines of OFCSs 604*a–b* become locked to each other, thereby making these OFCSs each other's clones. Similarly, when a locking procedure having locking steps "lock 1" and "lock 3" is performed, two comb lines of OFCS 604*a* are directly locked to two comb lines of OFCS 604*b*. Again, in this situation, OFCSs 604*a–b* also become each other's clones. Depending on the comb configurations of OFCS 602 and OFCSs 604*a–b*, these OFCSs can have full and/or partial clone relationships.

As already indicated above, having OFCS clones at various nodes of system 100 advantageously enables that system to employ PSK modulation and homodyne detection. For example, one OFCS clone, e.g., OFCS 604*a*, can be used at a transmitting node to produce a WDM signal. Then, another OFCS clone, e.g., OFCS 604*b*, can be used at a receiving node to produce appropriate LO signals and use them to perform homodyne detection of that WDM signal. Representative system configurations for using OFCS clones for the generation and detection of WDM signals are described in more detail in the above-referenced patent application entitled "Use of Beacons in a WDM Communication System."

While this invention has been described with reference to illustrative embodiments, this description is not intended to be construed in a limiting sense. For example, systems and methods of the invention can generally be used to provide two or more correlated light sources for any suitable application, not necessarily related to optical communications. In an optical communication system of the invention, internode communication links can be implemented as fiber links, free space links, or any other suitable optical-media links. Although the OFCS cloning process was described in reference to using two comb lines for obtaining a phase-lock, more than two comb lines can also be used to obtain such phase lock. If a slow frequency drift can be tolerated in the communication system, then the atomic-clock referencing of the master OFCS can be omitted. Various modifications of the described embodiments, as well as other embodiments of the invention, which are apparent to persons skilled in the art to which the invention pertains are deemed to lie within the principle and scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The same applies to the term "implementation."

Unless explicitly stated otherwise, each numerical value and range should be interpreted as being approximate as if the word "about" or "approximately" preceded the value of the value or range.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence. Likewise, additional steps may be included in such methods, and certain steps may be omitted or combined, in methods consistent with various embodiments of the present invention.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of cloning an optical-frequency comb source (OFCS), comprising the steps of:

receiving a first frequency comb generated by a first OFCS;

generating a second frequency comb using a second OFCS;

locking the phase of a first comb line of the second frequency comb to the phase of a first selected comb line of the first frequency comb; and locking the phase of a second comb line of the second frequency comb to the phase of a second selected comb line of the first frequency comb to cause the first and second frequency combs to have at least two common frequencies with the phases of the comb lines having the same common frequency locked to one another, thereby creating a clone relationship between the first and second OFCSs.

2. The invention of claim 1, wherein the second OFCS is a full clone of the first OFCS.

3. The invention of claim 1, wherein at least one of the first and second OFCSs is a mode-locked laser implemented in an integrated circuit.

4. The invention of claim 1, wherein:

the first OFCS is a master OFCS; and the second OFCS is a slave OFCS.

5. The invention of claim 1, wherein each of the first and second OFCSs is a slave OFCS.

6. The invention of claim 1, wherein the spectral separation between adjacent comb lines in the first frequency comb is substantially the same as the spectral separation between adjacent comb lines in the second frequency comb.

7. The invention of claim 1, further comprising the step of generating a third frequency comb using a third OFCS, wherein the phases of one or more comb lines of at least one of the first and second frequency combs and the phases of respective one or more comb lines of the third frequency comb are locked to each other.

8. The invention of claim 1, further comprising the steps of:

optically filtering the second frequency comb to separate the first and second comb lines of said second frequency comb;

mixing the first separated comb line with a first copy of a reference signal having the first frequency comb to produce a first pair of interference signals;

mixing the second separated comb line with a second copy of the reference signal to produce a second pair of interference signals;

converting the first pair of said interference signals into a first electrical signal indicative of a phase difference between the first comb line and a corresponding comb line of the reference signal;

converting the second pair of said interference signals into a second electrical signal indicative of a phase difference between the second comb line and a corresponding comb line of the reference signal; and based on the first and second electrical signals, controlling the second OFCS to achieve the locking of the phases.

9. Apparatus, comprising:

a first optical-frequency comb source (OFCS) adapted to generate a first frequency comb; and a second OFCS adapted to generate a second frequency comb, wherein the phases of two or more comb lines of the first frequency comb and the phases of two or more respective comb lines of the second frequency comb are locked to each other to cause the first and second frequency combs to have at least two common frequencies with the phases of the comb lines having the same common frequency locked to one another, thereby creating a clone relationship between the first and second OFCSs.

10. The invention of claim 9, wherein the second OFCS is a partial clone of the first OFCS.

11. The invention of claim 9, wherein the second OFCS is a full clone of the first OFCS.

12. The invention of claim 9, wherein at least one of the first and second OFCSs is a mode-locked laser implemented in an integrated circuit.

13. The invention of claim 9, wherein the spectral separation between adjacent comb lines in the first frequency comb is substantially the same as the spectral separation between adjacent comb lines in the second frequency comb.

14. The invention of claim 9, comprising first and second communication nodes, wherein:

the first communication node is adapted to modulate a comb line of the first frequency comb with data and transmit the resulting modulated signal to the second communication node; and the second communication node is adapted to perform homodyne detection of the transmitted modulated signal, wherein the respective comb line of the second frequency comb provides a local oscillator signal for said homodyne detection.

15. The invention of claim 9, wherein:

the first OFCS is a master OFCS; and the second OFCS is a slave OFCS.

16. The invention of claim 9, wherein each of the first and second OFCSs is a slave OFCS.

17. The invention of claim 9, wherein the system comprises a feedback circuit, comprising:

an optical filter adapted to select first and second comb lines from a frequency comb;

a first optical coupler adapted to mix the first selected comb line with a first copy of a reference signal to produce a first pair of interference signals;

a second optical coupler adapted to mix the second selected comb line with a second copy of the reference signal to produce a second pair of interference signals;

a first photodetector pair adapted to convert the first pair of interference signals into a first electrical signal indicative of a phase difference between the first comb line and a corresponding comb line of the reference signal;

a second photodetector pair adapted to convert the second pair of interference signals into a second electrical signal indicative of a phase difference between the second comb line and a corresponding comb line of the reference signal; and a control circuit adapted to generate, based on said first and second electrical signals, one or more control signals that are applied to an OFCS controlled by the feedback circuit to adjust the phases of the comb lines generated by said OFCS.

18. The invention of claim 17, wherein:

the feedback circuit is configured to control the second OFCS; and the reference signal comprises the first frequency comb.

19. Apparatus, comprising:

means for receiving a first frequency comb generated by a first optical-frequency comb source (OFCS);

means for receiving a second frequency comb generated by a second OFCS; and means for locking the phases of two comb lines generated by the second OFCS to the phases of respective two comb lines generated by the first OFCS, wherein said means for phase-locking is adapted to cause the first and second frequency combs to have at least two common frequencies with the phases of the comb lines having the same common frequency locked to one another, thereby creating a clone relationship between said first and second OFCSs.

20. The invention of claim 19, further comprising at least one of the first and second OFCSs.

* * * * *